(12) United States Patent
Malcolm et al.

(10) Patent No.: US 8,955,880 B2
(45) Date of Patent: Feb. 17, 2015

(54) CARRIER ADJUSTABLE HEADBOARD

(71) Applicant: Oshkosh Corporation, Oshkosh, WI (US)

(72) Inventors: James F. Malcolm, Waynesboro, PA (US); Sanjeev T. Kuriakose, Shippensburg, PA (US); Brandon F. Tucker, Harrisonville, PA (US)

(73) Assignee: Oshkosh Corporation, Oshkosh, WI (US)

( * ) Notice: Subject to any disclaimer, the term of this patent is extended or adjusted under 35 U.S.C. 154(b) by 148 days.

(21) Appl. No.: 13/794,381

(22) Filed: Mar. 11, 2013

(65) Prior Publication Data

US 2014/0255136 A1    Sep. 11, 2014

(51) Int. Cl.
*B60R 21/02* (2006.01)
*B62D 33/02* (2006.01)
*B60P 3/12* (2006.01)

(52) U.S. Cl.
CPC ............. *B62D 33/0207* (2013.01); *B60P 3/122* (2013.01)
USPC ........ 280/748; 280/756; 296/26.04; 224/500; 224/501

(58) Field of Classification Search
USPC ............... 280/748, 755, 756; 296/26.04, 102; 224/500, 501, 551
See application file for complete search history.

(56) References Cited

U.S. PATENT DOCUMENTS

| | | | |
|---|---|---|---|
| 3,664,704 A * | 5/1972 | Ellis | 296/37.6 |
| 3,848,758 A | 11/1974 | Carter | |
| 4,732,420 A | 3/1988 | O'Neil et al. | |
| 5,165,707 A * | 11/1992 | Morimanno et al. | 280/756 |
| 5,258,893 A * | 11/1993 | Finneyfrock | 362/485 |
| 6,557,917 B1 * | 5/2003 | Colcombe | 296/3 |
| 6,983,968 B2 | 1/2006 | Brauer et al. | |
| 7,494,169 B2 * | 2/2009 | Collins | 296/3 |
| 7,686,335 B2 * | 3/2010 | Kasubke | 280/756 |
| 7,726,688 B2 * | 6/2010 | Setina | 280/748 |
| 7,828,328 B2 | 11/2010 | Hulscher et al. | |
| 2003/0011180 A1 * | 1/2003 | Coffman et al. | 280/748 |
| 2003/0205891 A1 * | 11/2003 | Nass | 280/756 |
| 2005/0140129 A1 * | 6/2005 | Miki et al. | 280/756 |
| 2006/0290125 A1 * | 12/2006 | Kasubke | 280/756 |
| 2011/0108590 A1 | 5/2011 | Kennedy et al. | |
| 2011/0221233 A1 | 9/2011 | Damsi | |

* cited by examiner

*Primary Examiner* — Toan To
(74) *Attorney, Agent, or Firm* — Foley & Lardner LLP

(57) ABSTRACT

An adjustable headboard for a carrier vehicle includes a hoop with a first frame member having a proximal end and a distal end, a second frame member having a proximal end and a distal end, and a connecting member extending between the distal end of the first frame member and the distal end of the second frame member. The hoop is moveable between a first position and a second position. The adjustable headboard further includes a stationary base with a first receiving channel and a second receiving channel and a retainer coupled to the hoop to secure the hoop in the first position and the second position.

20 Claims, 8 Drawing Sheets

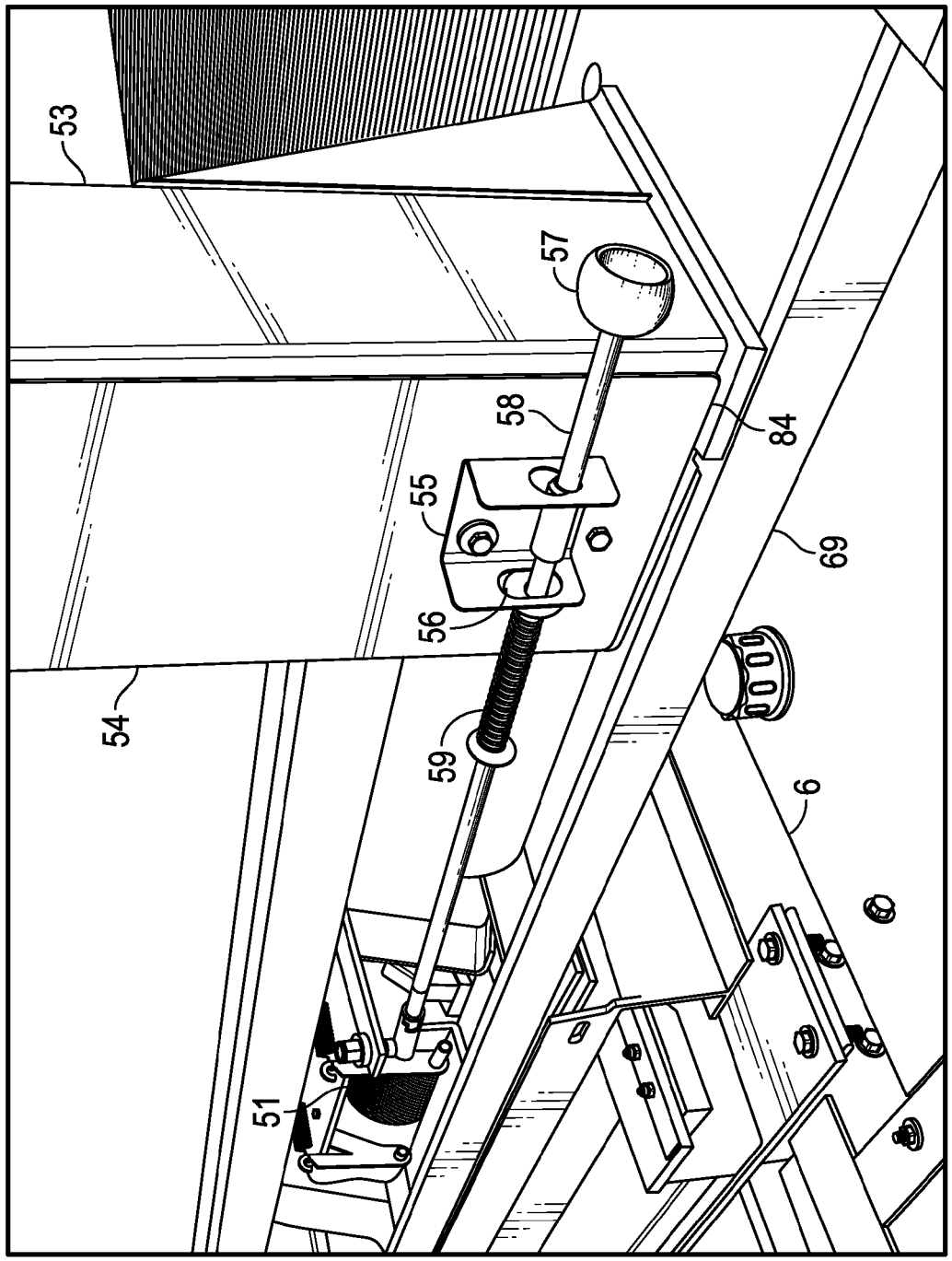

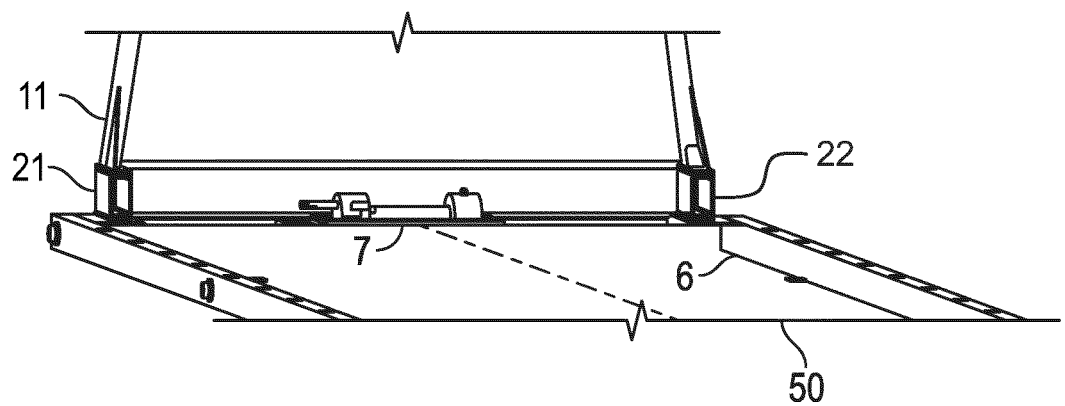
FIG. 3A
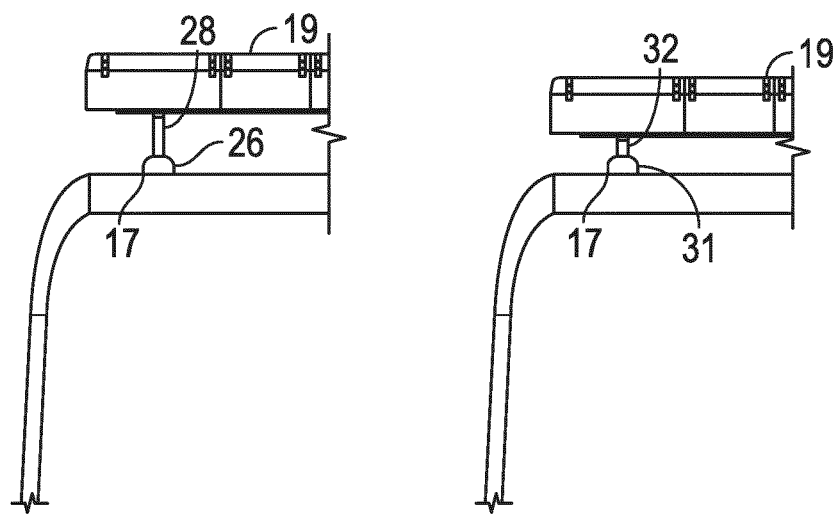
FIG. 3B        FIG. 3C

CARRIER ADJUSTABLE HEADBOARD

BACKGROUND

The present application relates generally to rollback carriers and tow truck vehicles. In particular, the present application relates to headboards or cab protectors for such vehicles. One function of a headboard is to provide a barrier between the carrier load on a flat bed and a driver's compartment or cab. Another function of a headboard is to provide a mounting surface at or above the top of the truck or chassis cab to mount emergency flashing lights or other accessories.

Traditional headboards are built to accommodate chassis systems and cabs at specific heights. For a given height, the headboard may require modification to accommodate cutouts and to permit access depending on the options selected for a particular model or carrier. One source of complexity for headboards arises from adaptations to include screens in the upper opening of the headboard in cargo transport applications.

By way of example, conventional headboards may necessitate design, production, and use of many weldments to accommodate variations in chassis systems and cabs. Varying distances exist from the top of the chassis frame to the top of the chassis cab across chassis models. Further, additional weldments are needed in the form of spacers to increase the height of the headboard. Conventional headboards require a sizeable array of parts to ensure an appropriate design tailored to the cabs of various makes, models, and configurations of different vehicles. Different carrier bed designs or carrier beds having different capacities produce still additional variation in the distance between the carrier bed and the top of the cab assembly. The number of variations imposes challenges in correctly selecting the appropriate configuration of parts, especially when the chassis on which the headboard will be mounted has not yet been identified by a designer.

SUMMARY

One exemplary embodiment relates to an adjustable headboard for a carrier vehicle including a hoop with a first frame member having a proximal end and a distal end, a second frame member having a proximal end and a distal end, and a connecting member extending between the distal end of the first frame member and the distal end of the second frame member. The hoop is moveable between a first position and a second position, and the headboard further includes a stationary base. The stationary base includes a first receiving channel that includes a first pair of opposing sidewalls such that the proximal end of the first frame member is positioned between the first pair of opposing sidewalls. The stationary base further includes a second receiving channel that includes a second pair of opposing sidewalls such that the proximal end of the second frame member is positioned between the second pair of opposing sidewalls. The stationary base includes a retainer coupled to the hoop that secures the hoop in the first position and the second position.

Another exemplary embodiment relates to a carrier assembly for a truck that includes a truck bed including a fore end and an aft end that define a bed surface, in addition to an adjustable headboard coupled to the fore end of the truck bed along the bed surface. The adjustable headboard includes a hoop with a first frame member and a second frame member, and a connecting member extending between a distal end of the first frame member and a distal end of the second frame member. The hoop is moveable between a first position and a second position and the headboard further includes a stationary base.

Still another exemplary embodiment relates to a carrier truck. The carrier truck includes a chassis, a cab coupled to the chassis, a bed movably coupled to the chassis, and an adjustable headboard coupled to the bed. The adjustable headboard includes a hoop with a first frame member and a second frame, and a connecting member extending between a distal end of the first frame member and a distal end of the second frame member. The hoop is moveable between a first position and a second position and the headboard further includes a stationary base.

The invention is capable of other embodiments and of being carried out in various ways. Alternative exemplary embodiments relate to other features and combinations of features as may be generally recited in the claims.

BRIEF DESCRIPTION OF THE FIGURES

The invention will become more fully understood from the following detailed description taken in conjunction with the accompanying drawings wherein:

FIG. 2C is a front view of an adjustable headboard including a cutout for a winch management device, according to an exemplary embodiment;

FIG. 3A is a rear view of an adjustable headboard including spacers;

FIG. 3B is a partial rear view of an adjustable headboard with ⅞" brackets for mounting an emergency lighting system, according to an exemplary embodiment;

FIG. 3C is a partial rear view of an adjustable headboard with 2¼" brackets for mounting an emergency lighting system, according to an exemplary embodiment;

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1A:
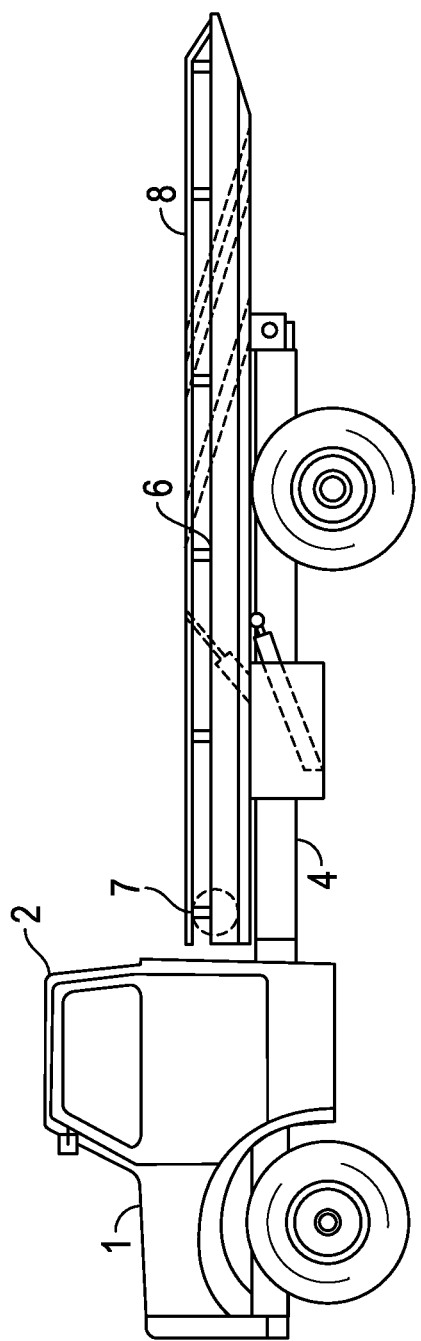
FIG. 1A is a side view of a carrier truck.

As shown in FIG. 1A, a carrier vehicle is a truck 1 including a cab 2 and a chassis 4. The truck further includes a platform or truck bed 6 having a bed surface 8. The bed 6 can slide forwardly and upwardly to a position behind the cab 2 so as to form a continuous inclined ramp with a forward above-cab platform. A winch 7 can be used, for example, to pull an automobile onto the bed 6. According to an exemplary embodiment, tie downs are used to secure the automobile to the bed 6 (e.g., during transit, etc.).

In trucks such as the truck of FIG. 1A, a headboard can be positioned between the cab 2 and the bed 6. Traditional headboards require a large number of parts and weldments to accommodate variations in heights and accessories. Vehicles outfitted with such headboards must meet federal crashworthiness standards. According to an exemplary embodiment, a headboard reduces the number of parts and weldments required to accommodate various heights. Embodiments of the headboard incorporate stylistic effects that are aesthetically pleasing. Embodiments of the headboard eliminate the need for multiple additional weldments, spacers, and additional accommodations for various emergency lighting and other accessories.

Some embodiments permit the headboard height to be adjustable between 45 and 66 inches. According to an exemplary embodiment, such adjustability is provided in two inch increments. At least one embodiment of the headboard has a screen adapted to a movable hoop by bolt on pieces, avoiding the need for welding. Embodiments of the headboard can accommodate chassis systems and cabs having wide variations in height and configurations. Embodiments of the headboard assembly may attain heights of 45, 50, or 57 inches, for example. These headboards may include a screen or panel that provides additional separation between a vehicle cab and a load. Such headboards may include a cutout in the panel for mechanical connections to the winch. The headboard having an adjustable height reduces or eliminates the need for intermediate spacer weldments, according to an exemplary embodiment. Different weldments may be needed if the headboard is configured to include additional accessories. For example, two different weldments, such as mounting brackets of 0.875 and 2.25 inches in height, may be needed to accommodate different emergency light mounting options.

Furthermore, embodiments of the headboard may be configured to comply with application-specific requirements for crash protection and penetration resistance. Regardless of the number of weldments or complexity of the design variation, manufacturers must ensure compliance with such requirements. Moreover, it is difficult to accommodate a wide variety of weldments in headboards that comply with federal regulations while being aesthetically appealing. The additional components needed introduce design complexities and represent additional sources of manufacturing cost. The large number of parts makes repair and replacement more complicated and may prolong maintenance and increase downtime if the required components are not readily available. Furthermore, such additional parts introduce additional supply chain requirements.

Adjustable Headboard with Movable Hoop

Figure 1B:
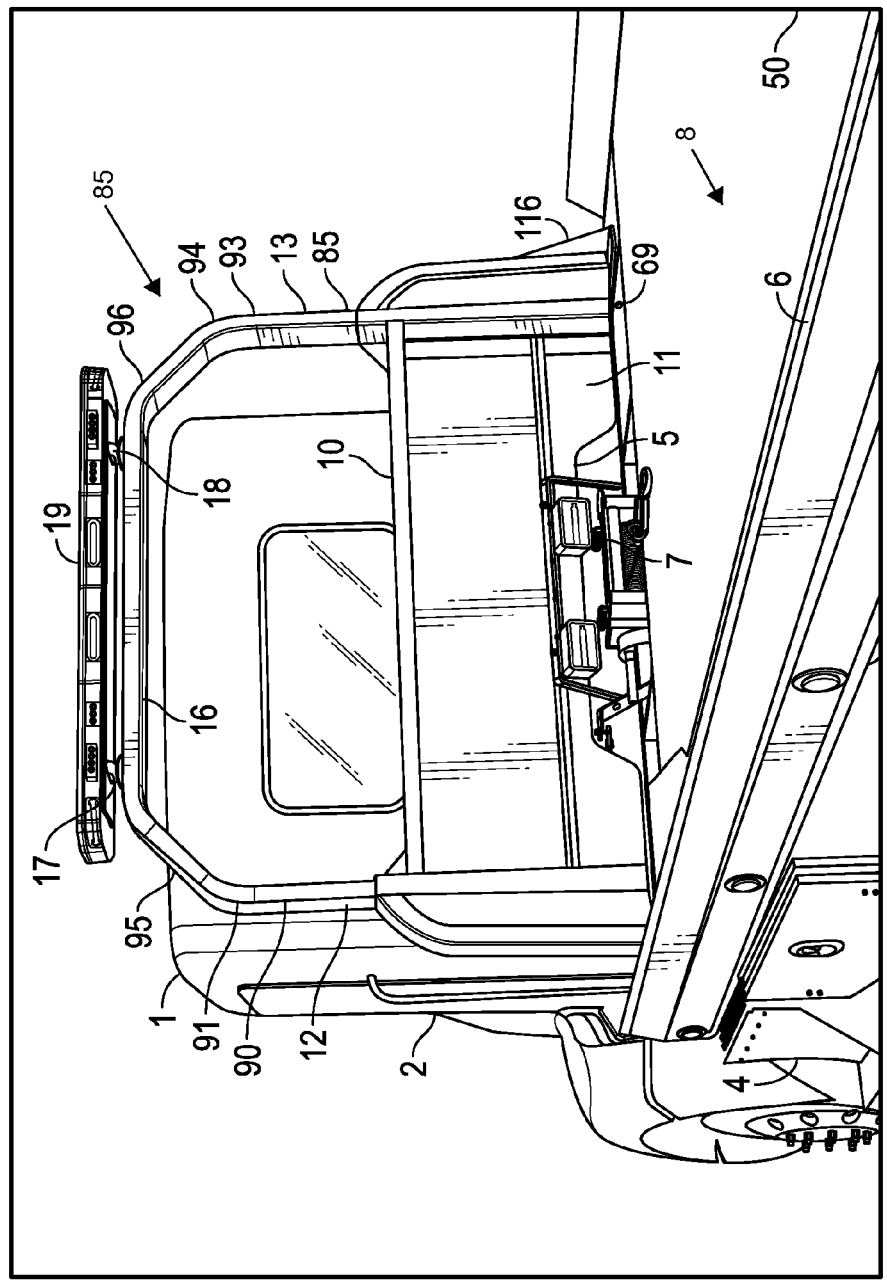
FIG. 1B is a rear perspective view of a carrier truck with an adjustable headboard, according to an exemplary embodiment.

Referring to the exemplary embodiment shown in FIG. 1B, the truck 1 includes an adjustable headboard 9. The truck 1 includes the cab 2 and the bed 6 having the bed surface 8. The cab 2 is coupled to the chassis 4 of the truck, and the bed 6 is coupled movably to the chassis 4. According to the exemplary embodiment shown in FIG. 1B, a carrier assembly is provided for the bed 6 including a fore end 69 and an aft end 50. The adjustable headboard 9 is coupled to the fore end 69 of the bed 6 along the bed surface 8. In some embodiments, the headboard may instead be coupled to the chassis (e.g., coupled to the frame behind the cab in a stationary configuration). A stabilizing portion 116 is added to left and right retaining structures of the headboard to provide additional support. In some embodiments, such a stabilizing portion may be shaped like a wedge or like a fin. As shown in FIG. 1B, the adjustable headboard 9 includes a stationary base 11 and a moveable hoop 85. In at least one embodiment, the stationary base 11 includes a recess 5 through which at least one of the winch 7 and a winch management device (e.g., a free-spool mechanism, etc.) may be fitted. The winch 7 may be coupled to the stationary base and the bed 6 of the carrier truck 1, to the stationary base 11, or to still another structure.

Figure 4:
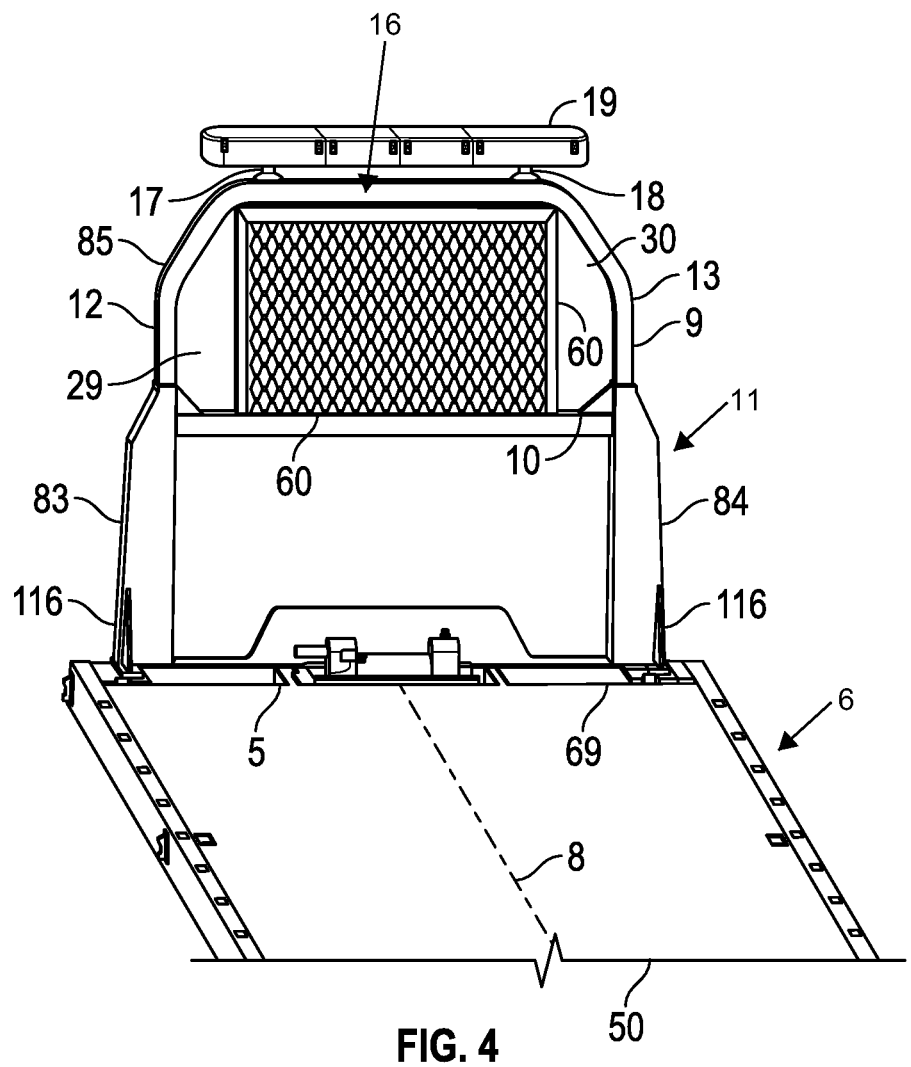
FIG. 4 is a rear view of an adjustable headboard adapted to include a screen, according to an exemplary embodiment.

According to the exemplary embodiment shown in FIGS. 1B and 4, a carrier vehicle includes the bed 6 with the fore end 69 and an aft end 50 defining the bed surface 8. The adjustable headboard 9 is coupled to the fore end 69 of the bed 6 along the bed surface 8. The stationary base 11 of the adjustable headboard 9 includes a retainer. The retainer includes a left retaining structure 83 and a right retaining structure 84 that are positioned at the fore end 69 of the bed surface 8. The stationary base 11 includes the recess 5 that is a cutout through which at least one of the winch 7 and a winch management device (e.g., a free-spool mechanism, etc.) may be positioned. According to an exemplary embodiment, the recess 5 accommodates different winch management devices (e.g., different free-spool mechanisms, different winch options, etc.). As shown in FIG. 4, stationary base 11 includes a connecting member 10 that joins the left retaining structure 83 and the right retaining structure 84. According to an exemplary embodiment, the connecting member 10 is horizontally disposed and rigidly secured between left retaining structure 83 and right retaining structure 84. As shown in FIG. 4, a screen 60 is positioned above the connecting member 10.

As shown in FIG. 1B, the moveable hoop 85 includes a left side member 12 and a right side member 13. Each of left and right side members 12 and 13 is a frame member inclined upward from the base portion towards a top portion 16. A curved left side portion 91 connects the left side member 12 to the top portion 16, and a curved right side portion 94 connects the right side member 13 to the top portion 16. It should be understood that left side member 12, top portion 16, and right side member 13 may be integrally formed (e.g., from a single bent tube, etc.) or may be formed from separate components coupled (e.g., welded, etc.) together. The top portion 16 has attachment points 17 and 18 for mounting an accessory, shown as emergency lighting system 19. The headboard of FIG. 1B can be, for example, 45 inches in height. Alternatively, by way of example, the headboard of FIG. 1B could be 50 inches or 57 inches in height.

Movable Hoop Adjustable to a Plurality of Heights

Figure 2A:
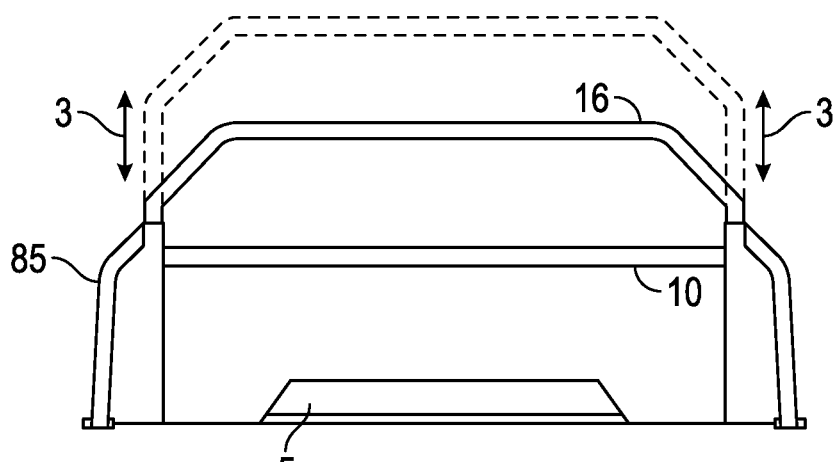
FIG. 2A is a rear view of an adjustable headboard according to an exemplary embodiment.
Figure 2B:
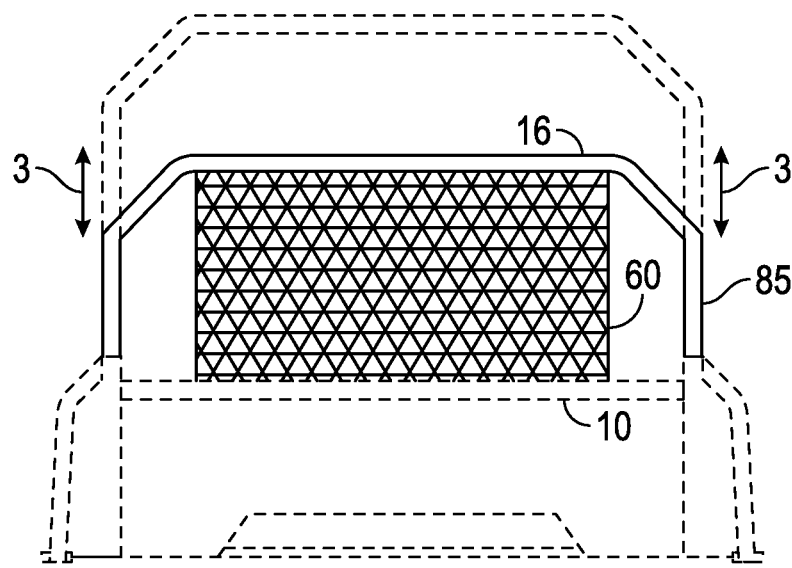
FIG. 2B is a rear view of an adjustable headboard adapted to include a screen, according to an exemplary embodiment.

In the exemplary embodiments shown in FIGS. 2A and 2B, the adjustable headboard is configured to attain a plurality of heights. The adjustability of the headboards of FIGS. 2A and 2B to attain the plurality of heights is depicted using dashed lines to show representative positions. FIG. 2A depicts an exemplary embodiment of a headboard with the recess 5. Arrows 3 in FIGS. 2A and 2B indicate a direction of movement in which headboards can be adjusted. FIG. 2B depicts an exemplary embodiment of a headboard with a screen 60. It will be appreciated that because FIGS. 2A-2B depict headboards can achieve a plurality of heights, attachment points 17 and 18 for mounting the emergency lighting system as shown in FIG. 1B can be positioned in corresponding heights.

Referring once more to the exemplary embodiment shown in FIG. 2A, the adjustable headboard 9 permits the movable hoop 85 to attain a first desired height when the movable hoop is in a first position. The dashed lines indicate a second height that may be attained by the movable hoop when the movable hoop is in a second position. Referring to the exemplary embodiment of FIG. 2B, a first desired height and a second desired height may be attained by the movable hoop 85 for the adjustable headboard 9 adapted to include a screen 60. The movable hoop 85 attains the first desired height when in a first position and the second desired height when in a second position, the first and second positions corresponding approximately to the ends of arrows 3. According to an exemplary embodiment, the moveable hoop 85 may be positioned in various intermediate locations between the first position and the second position. By way of example, a plurality of intermediate settings may facilitate setting the headboard to various heights (e.g., in increments of two inches, etc.).

Adjustable Headboard Configured with Recess for a Winch

Referring to the exemplary embodiment shown in FIG. 2C, the right retaining structure 84 of the stationary base 11 of the adjustable headboard 9 includes an outer side 53 and a front side 54 that parallels a fore end 69 of the bed 6. According to an exemplary embodiment, components of a winch management device (e.g., a free-spool mechanism, etc.) is coupled to at least one of the right retaining structure 84 and the left retaining structure 85. A bracket 55 can be attached to the front side 54. The bracket 55 includes at least one opening 56 through which an operator 57 for the winch 7 may be extended. The operator 57 includes a rod 58 connected to a spring 59 that attaches to a cabling mechanism 51 of the winch 7. The winch 7 is connected to the stationary base 11 of the adjustable headboard 9 and the bed 6 of the truck, according to an exemplary embodiment. According to an alternative embodiment, the winch 7 may be coupled the stationary base 11, the bed 6, or still another structure. FIG. 3A further shows the positioning of winch 7 closer to the aft end 50 of the bed 6.

Adjustable Headboard Configured with at Least One Spacer

According to an exemplary embodiment, adjustable headboard 11 provides adjustability thereby reducing or eliminating intermediate spacer members between the adjustable headboard 11 and the bed 6 (e.g., movable hoop 85 is adjustable and positioned at a preferred location relative to the cab, etc.). Referring to the alternative embodiment shown in FIG. 3A, the adjustable headboard 11 includes a left spacer 21 and a right spacer 22. In some embodiments, the left spacer 21 and the right spacer 22 elevate the entire adjustable headboard 11 above bed 6. Each spacer is used to raise the height of a side member from a first height to a second height elevated above the bed 6. By way of example, the left spacer 21 can be used to raise the height of the left side member from fifty to fifty-seven inches. In the embodiment of FIG. 3A, no recess for the winch 7 is provided.

As shown in FIG. 3A, the left spacer 21 and the right spacer 22 each represent an additional component of the adjustable headboard. However, unlike conventional headboards, only one such spacer may be needed on each side of the headboard. Thus, embodiments of the adjustable headboard can avoid using higher numbers of components, thus reducing complexity from a manufacturing and inventory perspective. By using fewer components and being adaptable to different configurations, embodiments of the headboard reduce the risk of misalignment.

Mounting Brackets for Attaching Accessories

According to an exemplary embodiment, adjustable headboard 11 provides adjustability thereby reducing or eliminating intermediate spacer members between the adjustable headboard 11 and the emergency lighting system 19 (e.g., movable hoop 85 is adjustable and positioned at a preferred location relative to the cab, etc.). According to the alternative embodiment shown in FIG. 3B, the headboard includes a mounting bracket 26 extending from a left attachment point 17 on the top portion 16 of the headboard. As shown in FIG. 3B, the mounting bracket 26 includes a mounting base and a cylindrical member 28 that interfaces with the emergency lighting system 19. The mounting base may have a semi-spherical shape or still another shape. According to the alternative embodiment shown in FIG. 3C, the headboard includes a mounting bracket 31 having a mounting base and a cylindrical member 32. As shown in FIGS. 3B-3C, cylindrical member 28 is longer than cylindrical member 32. In some embodiments, the length of the cylindrical member is selected to position the emergency lighting system 19 at a preferred height (e.g., relative to the cab of the carrier truck). In some embodiments, the mounting brackets 26 and 31 affix the emergency lighting system 19 to the headboard thereby improving visibility, particularly inasmuch as the emergency lighting system provides desirable redundancy.

Adjustable Headboard with Screen

Referring next to the exemplary embodiment shown in FIG. 4, a carrier vehicle includes the adjustable headboard 9 with the stationary base 11 that has the left retaining structure 83 and the right retaining structure 84. The connecting member 10 unites the left retaining structure 83 and the right retaining structure 84. The movable hoop 85 is disposed above the connecting member 10. The movable hoop 85 has the top portion 16 upwards of the connecting member 10. The movable hoop features the left side member 12 and the right side member 13. In some embodiments, the left side member 12 and the right side member 13 may be entirely rectilinear. In alternative embodiments, left and right side members 12 and 13 may be partially curvilinear or may include both straight and inclined segments.

Referring again to the headboard of FIG. 4, the adjustable headboard 9 includes the protective screen 60 to further isolate the cab of the carrier vehicle from a load being transported on the vehicle. The screen 60 is rectilinear in shape and is disposed horizontally between the left side member 12 and right side member 13 of the adjustable headboard. The screen 60 is positioned vertically between the connecting member 10 and the top portion 16. A left side mounting plate 29 is positioned between the right of the left side member 12 and the left of the screen 60 above the base portion 11. The left side mounting plate 29 connects the screen 60 to the left side member 12. A right side mounting plate 30 is positioned between the right of the screen 60 and the left of the right side member 13. The right side mounting plate 30 connects the screen 60 to the right side member 13.

Referring once more to the exemplary embodiment shown in FIG. 4, the top portion 16 has attachment points 17 and 18 at which mounting brackets may be fixed. Mounting brackets can, for example, connect to emergency lighting system 19 that can be affixed to the adjustable headboard. It will be appreciated that alternative embodiments may include one attachment point or a plurality of attachment points. It will be further appreciated that no mounting brackets or emergency lighting system may be attached to the headboard. Alternatively, mounting brackets at respective attachment points 17 and 18 may be used to fix emergency lighting system 19, other accessories, or still other components to the headboard. In some embodiments, attachment points 17 and 18 engage with attachment mechanisms other than mounting brackets (e.g., a leveling system for the emergency lighting system 19, etc.).

Figure 5A:
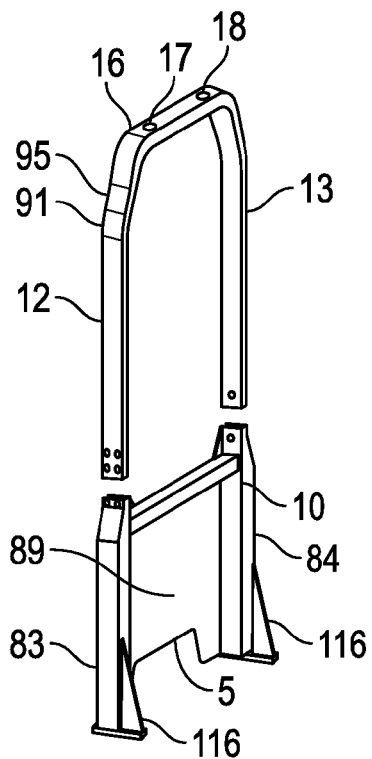
FIG. 5A is a perspective view of a movable hoop and a stationary base for an adjustable headboard, according to an exemplary embodiment.
Figure 5B:
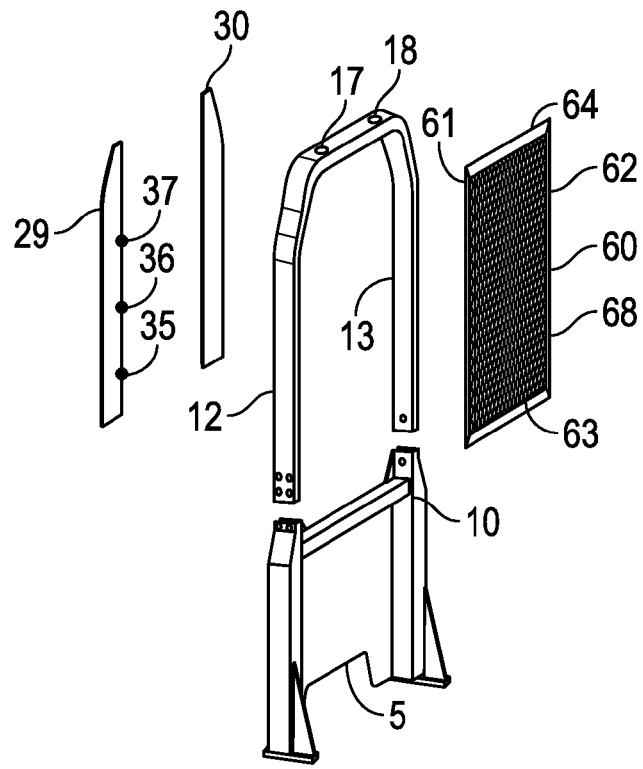
FIG. 5B is an exploded view of an adjustable headboard, according to an exemplary embodiment.

In the exemplary embodiment shown in FIG. 5B, the adjustable headboard is adapted to include a screen 60. The screen 60 includes a screen surface 68 and is bordered on upper and lower portions by an upper frame portion 64 and a lower frame 63. Sides of the screen 60 are bordered by a left side frame 61 and a right side frame 612 between which the screen 60 is sandwiched. The left and right side frames may include a plurality of attachment points at which the screen may be connected by bolts to the left and right side mounting plates (not shown). Top and bottom frame members may include additional attachment points for bolting the screen to at least one mounting point. It will be understood that not all of the attachment points may be used and that alternative fastening mechanisms can be employed, i.e., attachment mechanisms may include means other than bolting.

Headboard Assembly and Finishing

Turning again to the exemplary embodiment of FIG. 1B, left and right side members 12 and 13 extend upward from stationary base 11. The left side member 12 includes a proximal end (not shown) and a distal end 90. The distal end 90 of the left side member 12 abuts the curved left side portion 91 of the movable hoop. The right side member 13 has a proximal end (not shown) and a distal end 93. The distal end 93 of the right side member 13 abuts the curved right side portion 94 of the movable hoop 85. The curved left side portion 91 is joined to an inclined left portion 95 of the movable hoop such that the curved left side portion 91 is between the left side member 12 and the inclined left portion 95. Inclined portions 91 and 96 are angled portions that can be inclined with the same angle or with different angles. The curved right side portion 94 is joined to an inclined right portion 96 of the movable hoop such that the curved right side portion 94 is between the right side member 13 and the inclined right portion 96.

In some embodiments, the adjustable headboard 9 is painted using an electrocoating or "e-coating" process. In such a process, at least one element of the adjustable headboard, e.g., the side members, movable hoop, top portion, stationary base is submerged in a paint and water bath, and electricity is used to deposit paint onto the at least one element. Such a process serves to avoid manual painting while providing a systematic and efficient method to apply a corrosion-inhibiting primer to the at least one element.

Retaining Structures

Referring to the exemplary embodiment shown in FIG. 5A, the stationary base 11 includes the left retaining structure 83 and the right retaining structure 84. Stabilizing portions 116 may respectively connect the left and right retaining structures 83 and 84 to the bed 6. The stationary base has a planar front surface 89 that is a medial portion. A screen 60 or other accessories can be disposed above the medial portion. The medial portion further includes the recess 5 and that extends between the left and right retaining structures 83 and 84. The connecting member 10 bridges the left and right retaining structures 83 and 84. The connecting member 10 may be horizontal and rectilinear. Each of the left retaining structure 83 and the right retaining structure 84 has a pair of opposing sidewalls. The left and right retaining structures includes channels into which each of the side members may be extended such that each retaining structure partially envelops each side member. The left and right retaining structures can be hollow to permit ingress of the side members.

Figure 6A:
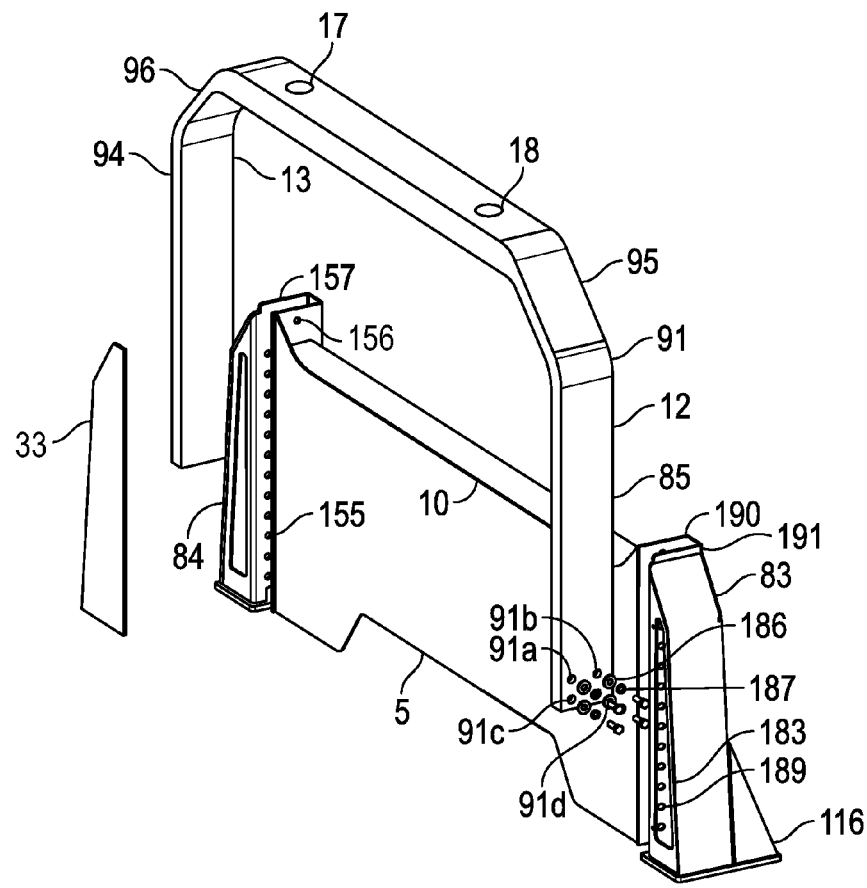
FIG. 6A is an exploded view of an adjustable headboard, according to an exemplary embodiment.

Referring to the exemplary embodiment shown in FIG. 6A, a movable hoop includes the left side member 12 and the right side member 13. The left side member 12 connects to the left retaining structure 83 and a left inclined portion 91 of the movable hoop. The left curved portion connects to left inclined portion 95. The right side member 13 connects to the right retaining structure 84 and the curved right portion 94 of the movable hoop, the right curved portion connecting in turn to inclined right portion 96. The inclined left portion 91 and the inclined right portion 96 are inclined towards each other.

The top portion 16 extends horizontally between the inclined left portion 95 and the inclined right portion 96. The top portion 16 has the left attachment point 17 and a right attachment point 18. A left bracket can attach to the left attachment point 17, and a right bracket can attach to the right attachment point 18. In some embodiments, containers can be affixed via the brackets to the adjustable headboard.

Referring again to the exemplary embodiment shown in FIG. 6A, the movable hoop 85 includes the left side member 12 and the right side member 13 that are frame members for engagement with the stationary base 11. The left side member 12 engages with the left retaining structure 83 of the stationary base. In some embodiments, the left side member 83 includes a plurality of apertures 91a, 91b, 91c, 91d that engage with fitting portions within opposing sidewalls of the left retaining structure 83 that couple the side members to the retaining structures. It will be appreciated that various manners of coupling can be employed. The left side member 12 can thus engage with the left retaining structure 83 in a plurality of positions that allow the adjustable hoop to attain a plurality of heights. For example, the left side member 12 can engage with the left retaining structure 83 to attain a first position corresponding to a first height of the adjustable headboard and can also engage with the left retaining structure 83 to attain a second position corresponding to a second height of the adjustable headboard. Retaining structures 83 and 84 provide additional structural rigidity to the adjustable headboard. As shown in FIG. 6A, the movable hoop further includes the inclined left portion 95 and the inclined right portion 96 that respectively connect the left side member 12 and the right side member 13 to the top portion 16. The top portion 16 is provided with a plurality of attachment points 17, 18 via which a plurality of accessories may be affixed.

Mounting Plates

As shown in FIG. 5B, the left side mounting plate 29 may be connected to the left portion of a screen in order to affix the screen to the left side member of a movable hoop. The right mounting plate 30 may be connected to the right portion of the screen in order to affix the screen to the right side member of the movable hoop. The left and right side mounting plates may be shaped to conform to contours of the movable hoop; i.e., they may each include a rectilinear portion that parallels a rectilinear side member of the movable hoop and an inclined portion that mirrors an inclined portion of the movable hoop. However, it will be readily understood that the mounting plates 29 and 30 need not conform generally to the shape of the movable hoop, and that such mounting plates may not be necessary to affix a screen or other element between the top portion 16 of the movable hoop and the stationary base. In some embodiments, the left side mounting plate 29 and the right side mounting plate 30 are identical in material composition and surface finishing to the stationary base. Each mounting plate may include a plurality of attachment points 35, 36, and 37.

Referring again to the exemplary embodiment shown in FIG. 4, a screen 60 is bordered by the left side member 12 and the right side member 13. The screen 60 is rectilinear in shape and is positioned vertically between the connecting member 10 and the top portion 16. The left side mounting plate 29 is positioned between the right of the left side member 12 and the left of the screen 60. The left side mounting plate 29 connects the screen 60 to the left side member 12. The right side mounting plate 30 is positioned between the right of the screen 60 and the left of the right side member 13. The right side mounting plate 29 connects the screen 60 to the right side member 13. A width of the screen 60 is smaller than a distance between opposing sidewalls of the left retaining structure 83 and opposing sidewalls of the right retaining structure 84. In some embodiments, the screen 60 may include at least one opening or cutout to allow accessories to be attached to the adjustable headboard.

Opposing Sidewalls

Referring to the exemplary embodiment shown in FIG. 6A, the stationary base includes the left retaining structure 83 with the stabilizing portion 116 projecting outward. The left retaining structure has a fitting portion 182 that engages with the left side member 12. In the exemplary embodiment shown in FIG. 6A, the left retaining structure 83 includes sidewalls 190 and 191 that oppose each other. A first flange connects opposing sidewalls 190 and 191. The left side member 12 may be positioned between the opposing sidewalls 190 and 191. The right retaining structure 84 includes sidewalls 156 and 157 that oppose each other. A second flange connects opposing sidewalls 156 and 157. The right side member 13 may be positioned between the opposing sidewalls 156 and 157 of the right retaining structure 84. Each pair of opposing sidewalls defines a receiving channel. According to an exemplary embodiment, the right side member 13 may be disposed within the receiving channel and coupled to the right retaining structure 84 with a retainer. As shown in FIG. 6A, the retainer includes a plurality of apertures 155. According to an exemplary embodiment, a retainer also secures the left side member 12 to the left receiving structure 83. Such retainers may also include a fastener (e.g., bolt, rivet, etc.), a spring and ball detent, or still another system. A side plate 33 may be fitted to a portion of the right retaining structure 84 (e.g., to cover the adjustment access opening, etc.). The left side member 12 and the right side member 13 are disposed between opposing sidewalls 190 and 191 and between opposing sidewalls 156 and 157, respectively. According to an exemplary embodiment, the left side member 12 and the right side member 13 may be adjustably secured to the opposing sidewalls in a plurality of positions. Each of the plurality of positions alters the height of the adjustable headboard.

Figure 6B:
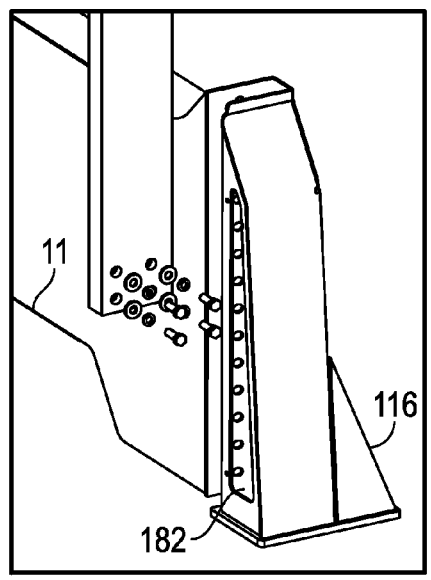
FIG. 6B is a partial exploded view of an adjustable headboard, according to an exemplary embodiment.

Referring to the exemplary embodiment shown in FIG. 6B, the stationary base 11 includes the left retaining structure 83 with the stabilizing portion 116 projecting outward. The left retaining structure 83 has the fitting portion 182 that engages with the left side member 12. The left side member 12 has the plurality of apertures 91a, 91b, 91c, 91d, as described above. Components can be inserted into each of these apertures for fixably attaching the left side member 12 within the left retaining structure 83. For example, each of the plurality of apertures 91a, 91b, 91c, 91d may be fitted with a washer 186, a nut 187, and a bolt 188 that connects into a corresponding aperture of a plurality of apertures 189 in the fitting portion 182 of the left retaining structure 12. The left side member 12 contacts two opposing sidewalls 190 and 191 of the left retaining member. In some embodiments, the left side member 12 does not contact the opposing sidewalls 190 and 191. By way of example, the left side member 12 may interface with the opposing sidewalls 190 and 191 through a slide or other device. According to an exemplary embodiment, the left side member 12 contacts at least one of the opposing sidewalls 190 and 191. According to still another alternative embodiment, the left side member 12 contacts both of the opposing sidewalls 190 and 191.

The right side member 13 has a plurality of apertures. The right side member 13 may be outfitted with components for fixably attaching the right side member 13 within the right retaining structure 84. For example, each of the plurality of apertures may be fitted with a washer, a nut, and a bolt that connects into a corresponding aperture of a plurality of apertures in the fitting portion 155 of the right retaining structure 84. In some embodiments, the right side member 13 does not contact the opposing sidewalls 156 and 157. By way of example, the right side member 13 may interface with the opposing sidewalls 156 and 157 through a slide or other device. According to an exemplary embodiment, the right side member 13 contacts at least one of the opposing sidewalls 156 and 157. According to still another alternative embodiment, the right side member 13 contacts both of the opposing sidewalls 156 and 157.

In some embodiments, opposing sidewalls 190 and 191 of the left retaining structure and opposing sidewalls 156 and 157 of the right retaining structure are replaced with cylindrical tubes into which the left side member 12 and the right side member 13 are inserted. In some embodiments, the left side member 12, the left curved portion 91, and the left inclined portion 95 are replaced with a telescoping left side member. Likewise, the right side member 13, the right curved portion 94, and the inclined right portion 96 may be replaced with a telescoping right side member. In some embodiments, bolts 168 connect into corresponding apertures 169 in the fitting portion of the retaining structures 83, 84 such that the bolts extend through the retaining structures and are visible on either side of the truck. In some embodiments, the movable hoop includes only curved segments. In some embodiments, the movable hoop can be outfitted with customized segments to achieve specific shapes, and may be emblazoned with illustrations and lettering.

According to various embodiments, a reduction in the number of components required to attain a desired height is achieved. Further, exemplary embodiments of the adjustable headboard are intended to be aesthetically appealing. It will be appreciated that a plurality of accessories may be affixed to the adjustable headboard. Additionally, it will be understood that the adjustable headboard provides a barrier between a carrier load on a flat bed and a driver's compartment in a cab. Moreover, the crashworthiness of the adjustable headboard may be ascertained to determine compliance with federal regulations.

It is important to note that the construction and arrangement of the elements of the systems as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements. The position of elements may be reversed or otherwise varied, and the nature or number of discrete elements or positions may be altered or varied. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present invention. The order or sequence of any process, logical algorithm, or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the spirit of the appended claims.

What is claimed is:

1. An adjustable headboard for a carrier vehicle, comprising:
   a hoop including a first frame member having a proximal end and a distal end, a second frame member having a proximal end and a distal end, and a connecting member coupling the distal end of the first frame member and the distal end of the second frame member, the hoop being moveable between a first position and a second position, and
   a stationary base, comprising:
      a first receiving channel that includes a first pair of opposing sidewalls, the proximal end of the first frame member positioned between the first pair of opposing sidewalls;
      a second receiving channel that includes a second pair of opposing sidewalls, the proximal end of the second frame member positioned between the second pair of opposing sidewalls, and
      a retainer coupled to the hoop, wherein the hoop translates within the first receiving structure and the second receiving structure between a first position and a second position, the retainer securing the hoop in the first position and the second position.

2. The adjustable headboard of claim 1, further comprising a first flange extending between the first pair of opposing sidewalls and a second flange extending between the second pair of opposing sidewalls.

3. The adjustable headboard of claim 2, wherein the first receiving channel parallels the second receiving channel.

4. The adjustable headboard of claim 3, wherein the hoop comprises a top portion sandwiched between a first angled portion and a second angled portion.

5. The adjustable headboard of claim 1, wherein the movable hoop comprises a bracket configured to couple an accessory to the hoop.

6. The adjustable headboard of claim 1, wherein the movable hoop is adjustable to achieve a desired height of the adjustable headboard.

7. The adjustable headboard of claim 6, wherein the desired height is attainable for a plurality of vehicles.

8. The adjustable headboard of claim 7, wherein the movable hoop is removably connected to the stationary base.

9. The adjustable headboard of claim 8, wherein a medial portion of the stationary base is disposed beneath the connecting member of the movable hoop and has a width that does not exceed a lateral distance between the first pair of opposing sidewalls and the second pair of opposing sidewalls, and wherein the medial portion is adaptable to include at least one cutout.

10. The adjustable headboard of claim 9, wherein the movable hoop is configured to permit attachment of a screen positioned between the first and second frame members.

11. The adjustable headboard of claim 1, wherein the movable hoop comprises a first set of apertures and a second set of apertures, the first and second sets of apertures extending through the movable hoop.

12. A carrier assembly for a truck, comprising:
   a truck bed including a fore end and an aft end and defining a bed surface; and
   an adjustable headboard coupled to the fore end of the truck bed along the bed surface, the adjustable headboard comprising:
      a hoop including a first frame member having a proximal end and a distal end, a second frame member having a proximal end and a distal end, and a connecting member coupling the distal end of the first frame member and the distal end of the second frame member, the hoop being moveable between a first position and a second position, and
      a stationary base, comprising:
         a first receiving channel that includes a first pair of opposing sidewalls, the proximal end of the first frame member positioned between the first pair of opposing sidewalls;
         a second receiving channel that includes a second pair of opposing sidewalls, the proximal end of the second frame member positioned between the second pair of opposing sidewalls, and
         a retainer coupled to the hoop, wherein the hoop translates within the first receiving structure and the second receiving structure between a first position and a second position, the retainer securing the hoop in the first position and the second position.

13. The assembly of claim 12, wherein the movable hoop comprises a first set of apertures and a second set of apertures, the first and second sets of apertures extending through the movable hoop.

14. The assembly of claim 13, wherein a medial portion extends downwardly from the connecting member of the movable hoop and has a width that does not exceed a lateral distance between the first pair of opposing sidewalls and the second pair of opposing sidewalls, and wherein the medial portion is adaptable to include at least one cutout.

15. The assembly of claim 14, wherein a cutout within the medial portion is configured to engage with a winch coupled to the truck bed.

16. The assembly of claim 12, wherein a desired height of the adjustable headboard is attainable for a plurality of trucks.

17. A carrier truck, comprising:
   a chassis;
   a cab coupled to the chassis;
   a bed movably coupled to the chassis; and
   an adjustable headboard coupled to the bed, the adjustable headboard comprising:
      a hoop including a first frame member having a proximal end and a distal end, a second frame member having a proximal end and a distal end, and a connecting member coupling the distal end of the first frame member and the distal end of the second frame member, the hoop being moveable between a first position and a second position, and
      a stationary base, comprising:
         a first receiving channel that includes a first pair of opposing sidewalls, the proximal end of the first frame member positioned between the first pair of opposing sidewalls,
         a second receiving channel that includes a second pair of opposing sidewalls, the proximal end of the second frame member positioned between the second pair of opposing sidewalls, and
         a retainer coupled to the hoop, wherein the hoop translates within the first receiving structure and the second receiving structure between a first position and a second position, the retainer securing the hoop in the first position and the second position.

18. The carrier truck of claim 17, wherein the connecting member comprises a horizontal portion sandwiched between a first angled portion and a second angled portion, and wherein the first angled portion extends between the distal end of the first frame member and the horizontal portion, and wherein the second angled portion extends between the horizontal portion and the distal end of the second frame member.

19. The carrier truck of claim 18, wherein the headboard is coupled to the chassis.

20. The carrier truck of claim 18, wherein the headboard is coupled to the truck bed.

* * * * *